Figure 1:
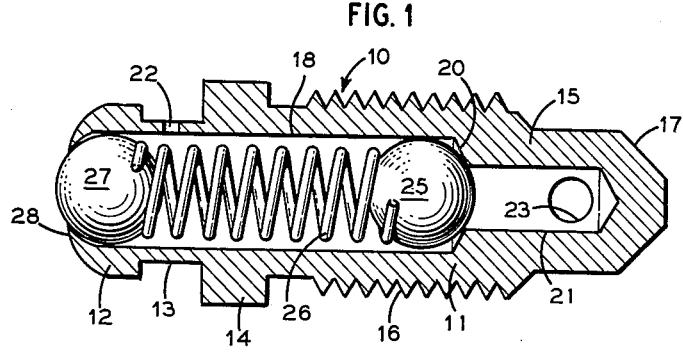

Aug. 21, 1962 F. PAGANO 3,050,080

BLEEDER VALVES

Filed May 11, 1959

INVENTOR.
Frank Pagano
BY
ATTORNEY

United States Patent Office 3,050,080
Patented Aug. 21, 1962

3,050,080
BLEEDER VALVES
Frank Pagano, Newark, N.J., assignor to Surelock Mfg. Co., Inc., Brooklyn, N.Y., a corporation of New York
Filed May 11, 1959, Ser. No. 812,331
5 Claims. (Cl. 137—614.17)

This invention relates to bleeder valves for the cylinders of hydraulic brake systems of motor vehicles and, more particularly, to a bleeder valve in which the bleeding is terminated when the system pressure is reduced to a preset value.

When hydraulic brake systems are re-filled or re-charged, it is necessary, for proper operation of the brake system, to bleed off any air entrapped in the system. This is effected by, for example, opening a valve in a cylinder and operating the brake. The air from the cylinder is then expelled through the open valve, together with some fluid. Care must be taken to prevent loss of too much fluid.

In one bleeding arrangement, a cylinder is formed with a small port opening into a valve seat at the inner end of a larger area valve chamber open at its outer end to atmosphere. A value is threaded into the valve chamber and has a reduced inner end engageable with the valve seat to seal off such port. When this valve is "cracked" a fraction of a turn and the brake pedal operated, air and fluid flow through the port, around the inner end of the valve, and through a port in such reduced inner end communicating with a passage opening through the valve outside the valve chamber. After bleeding, the valve is screwed in to close the cylinder port. The valve is formed with a polygonal surface portion for application of a wrench for easy operation of the valve.

This arrangement, while capable of easy operation, nevertheless results in an undue loss of the hydraulic fluid, in addition to which the unsealed externally opening passage may readily become obstructed with dirt or the like.

In accordance with the present invention, a bleeder valve of this general type is provided including novel and simple means for automatically terminating the bleeding when the system pressure is less than a pre-set value. Thereby, undue loss of fluid is avoided. In addition, the valve passage is closed against entry of moisture, dirt, or other foreign material.

More specifically, the valve body is formed with an axial passage open at its outer end and reduced in area near its closed inner end to form an internal shoulder. A ball, forming a check valve, seats against this shoulder and is held in place by a coil spring providing a pre-set loading. The outer end of the spring is engaged by a second ball in the outer end of the passage held therein by turning in the outer end of the passage after the second ball is inserted therein.

One or more radial passages or ports communicate with the axial passage in the reduced inner end of the valve and inwardly of the check valve ball. Bled fluid flows from the axial passage through one or more radial ports through the wall of this passage just inwardly of the outer ball, which restrict the flow of fluid to maintain the axial passage full of fluid to inhibit air flow into the passage. Alternatively, the axial passage is of such diameter as to restrict the flow of fluid from the cylinder.

The valve is used in bleeding in the same manner as described above. However, in the invention arrangement, bleeding continues only so long as the system pressure exceeds the pre-set spring pressure to unseat the ball check valve. When the system pressure drops below the spring pressure, the check valve closes, interrupting the bleeding. The valve is then turned to re-engage the valve seat and close the port.

Figure 2:
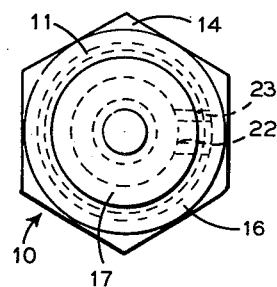
Figure 3:
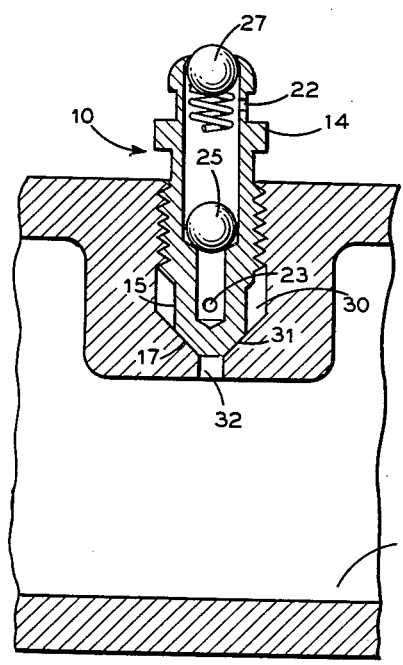
Figure 4:
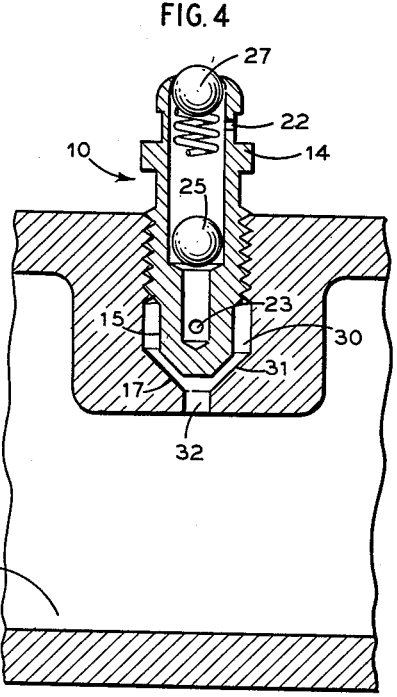

For an understanding of the invention principles, reference is made to the following description of a typical embodiment thereof as illustrated in the accompanying drawing. In the drawing:

FIG. 1 is an enlarged axial sectional view of the valve;
FIG. 2 is an inner end elevation view of the valve;
FIG. 3 is a partial sectional view of a cylinder of a hydraulic brake system, the valve of the invention being shown in closed position; and
FIG. 4 is a similar view with the valve in the bleeding position.

The construction of the bleeder valve will first be described, with reference to FIGS. 1 and 2 after which its operation will be described with particular reference to FIGS. 3 and 4.

Referring to FIG. 1, the valve 10 includes a relatively elongated body 11 which may, for example, be formed from hexagonal cold rolled steel bar stock. The stock is suitably turned or otherwise machined to form an outer end nipple 12, to receive a drain hose or the like, joined by a reduced portion 13 to a polygonal collar 14 designed to have a wrench applied thereto. Inwardly of collar 14, body 11 is externally threaded, as at 16, for screwing into a brake system cylinder, the threaded portion having a diameter somewhat less than that of collar 14.

The inner end 15 of body 11 is substantially reduced in diameter and formed with a frusto-conical seating portion 17 arranged to have fluid tight seating engagement on a frusto-conical valve seat at the inner end of a bleeding passage into which valve 10 is threaded.

Body 11 is drilled to form a relatively large diameter passage 18 opening outwardly through nipple 12 and extending inwardly about two-thirds the length of the body. A smaller diameter drilled passage 21 extends coaxially from the inner end of passage 18 to a point short of seating surface 17, so that body 11 has a closed inner end. One or more small diameter ports 22 are drilled through the wall of neck 13 to intersect passage 18, and one or more larger diameter ports 23 are drilled radially through the cylindrical surface of end 15 to intersect passage 21. Ports 22 are of reduced diameter to restrict the discharge of fluid from the valve passage when valve 25 is opened by fluid pressure from the hydraulic system acting through port 32 when valve 10 has the position of FIG. 4.

The junction of passages 18 and 21 provides a frusto-conical valve seat 29 for a ball check valve 25 which is pressed against seat 20 by a coil spring 26 having a pre-set loading. The outer end of spring 26 is engaged by a ball 27 which is held in place by turning in the end of nipple 12, after ball 27 is in passage 18, to form a lip 28.

Referring to FIG. 3, valve 10 is threaded into a bleeding chamber 30 of a cylinder 35 of a hydraulic brake system. Chamber 30 is formed with a frusto-conical inner end 31 forming a valve seat engaged by seating portion 17 of inner end 15 of valve 10, and a small diameter bleeder port 32 is formed through seat 31 to interconnect chamber 30 with the interior of cylinder 35. Valve 10 normally blocks port 32.

To bleed cylinder 35, a wrench is applied to collar 14 to unscrew valve 10 one-quarter to one-half turn to the position of FIG. 4. Fluid from cylinder 35 flows through port 32 into chamber 30 and through ports 23 into passage 21. When the brake pedal is operated, the fluid pressure lifts ball check valve 25 against the pressure of spring 26. The fluid then flows into passage 18 and through ports 22. Valve 25 remains lifted as long as the fluid pressure is in excess of the spring pressure. When the fluid pressure is less than the spring pressure, spring 26 re-seats valve 25 to block further flow of fluid into passage 18. Valve 10 is then re-seated to close port 32 by applying a wrench to collar 14.

When the valve 10 is initially unscrewed from the position of FIG. 3 to the position of FIG. 4, fluid passing from the cylinder 35 rushes through port 32 through the passageway between surfaces 17 and 31, and flows through inlet 23 into the passage 21, causing fluid to push ball 25 up against the spring 26. When this happens, fluid fills the bleeding valve chamber 18 around the ball 25. When this chamber fills up with fluid, any atmospheric air therein is expelled through outlet 22, and thus cannot enter into the hydraulic cylinder system. When the pedal is depressed and the hollow chamber fills with fluid, there will be fluid passing out through restricted ports 22, and this will keep on as long as there is pressure in the cylinder through the pedal action. When, however, the pedal action stops, the ball 25 will be snapped against seat 20 by spring 27. At this time, valve 10 is screwed in to the position of FIG. 3.

It will be noted that ball 27 closes the outer end of passage 18, thus blocking entry of foreign matter thereinto.

While a specific embodiment of the invention has been shown and described in detail to illustrate the application of the invention principles, it will be understood that the invention may be embodied otherwise without departing from such principles.

What is claimed is:

1. As an article of manufacture for use as a permanent part of a hydraulic brake system of the type provided with an outwardly opening bleeder passage having an inner end formed as a valve seat having a port therethrough, and threaded to receive a bleeder valve: a bleeder valve comprising a unitary one-piece valve body adapted for threading into a bleeder passage to extend outwardly therebeyond and having an inner end, of less diameter than that of the bleeder passage, formed with a valve surface adapted to engage the valve seat in the latter and close the port therein; said body having a passage extending longitudinally thereof through its outer end and into such inner end, and relatively unrestricted inlet port means connecting said passage to the outer lateral surface of such inner end outwardly of said valve surface; said body passage being formed with a valve seat intermediate its ends dividing it into an outer substantially unrestricted section and an inner substantially restricted section, and with restricted outlet port means opening through the wall of said body adjacent its outer end and having a flow area substantially less than that of said inlet port means; a spring-pressed check valve in said body passage engaged with said last-named valve seat and normally obstructing flow of fluid outwardly through said passage; and a second spring pressed check valve, within the outer section of the passage, engaged with a valve seat at the outer end of said passage and preventing flow of fluid outwardly through such outer end except when said second valve is pressed inwardly to disengage its valve seat; the fluid upon cracking of said bleeder valve to open the port in a bleeder passage, flowing into the bleeder passage and through said inlet port means into the inner substantially restricted section of said body passage; said check valve being lifted from its seat, when the fluid pressure exceeds the spring pressure, for flow of fluid past said check valve and through said outlet port means to completely fill said passage with fluid due to the restricted egress of fluid through such outlet port means in comparison with the substantially unrestricted ingress of fluid through said inlet port means, whereby to prevent entry of atmospheric air into said passage.

2. A bleeder valve as claimed in claim 1 in which said check valves are ball valves; and a coil spring engaged between said ball valves.

3. A bleeder valve as claimed in claim 1 in which said last-named valve seat is an annular shoulder at the junction of said inner and outer passage sections.

4. A bleeder valve as claimed in claim 2 in which said second ball check valve is retained in the body passage by a lip turned in thereover at the outer end of said body passage.

5. A bleeder valve as claimed in claim 1 in which said inlet port means comprises a relatively large diameter port extending radially of the inner end of said valve body, and said outlet port means comprises a small diameter port through the wall of said body adjacent its outer end.

References Cited in the file of this patent

UNITED STATES PATENTS

| 1,684,932 | Weatherhead | Sept. 18, 1928 |
| 2,064,573 | Tatter | Dec. 15, 1936 |
| 2,519,569 | Hart | Aug. 22, 1950 |
| 2,611,387 | Legerski | Sept. 23, 1952 |
| 2,708,450 | Mauer | May 17, 1955 |
| 2,771,093 | Wilson | Nov. 20, 1956 |

FOREIGN PATENTS

| 622,336 | France | 1927 |